(12) United States Patent
Moeller et al.

(10) Patent No.: US 8,226,065 B1
(45) Date of Patent: Jul. 24, 2012

(54) FORCE RESISTANT ASSEMBLIES AND SHOCK ABSORBING ARTICLE HOLDERS

(76) Inventors: Robert P. Moeller, Mt. Pleasant, MI (US); David P. Moeller, Sheridan, WY (US)

(*) Notice: Subject to any disclaimer, the term of this patent is extended or adjusted under 35 U.S.C. 154(b) by 677 days.

(21) Appl. No.: 12/231,447

(22) Filed: Sep. 3, 2008

(51) Int. Cl.
*F16M 13/00* (2006.01)

(52) U.S. Cl. .................................. 248/609; 248/621

(58) Field of Classification Search .......... 248/123.11, 248/125.7, 447, 562, 638, 125.8, 608, 158, 248/161, 162.1, 183.3, 441.1, 566, 674, 636; 211/170, 171, 64; 40/606.03, 606.16, 606.15, 40/602, 607.01, 607.11, 607.13, 607.08, 40/607.09, 608, 590, 611.11, 606.01; 280/489
See application file for complete search history.

(56) References Cited

U.S. PATENT DOCUMENTS

| | | | | |
|---|---|---|---|---|
| 4,247,030 A | * | 1/1981 | Amacker | 224/401 |
| 6,070,926 A | * | 6/2000 | Hardin | 296/26.08 |
| 2003/0201634 A1 | * | 10/2003 | Kramer | 280/762 |
| 2004/0227326 A1 | * | 11/2004 | Peters | 280/489 |
| 2005/0263984 A1 | * | 12/2005 | Gurtler | 280/489 |
| 2006/0214391 A1 | * | 9/2006 | Columbia | 280/491.5 |

OTHER PUBLICATIONS

Ondrives Ltd., Online Catelog—Rosta Type Suspension Units, Oct. 16, 2006, www.ondrives.com, p. 1.*

* cited by examiner

*Primary Examiner* — Terrell McKinnon
*Assistant Examiner* — Eret McNichols
(74) *Attorney, Agent, or Firm* — Robert L. McKellar; McKellar IP Law, PLLC

(57) ABSTRACT

Force resistant assemblies and shock absorbing articles prepared therefrom. The force resistant assemblies comprise a combination of square torsion bars held in a housing within a series of elongated elastomeric strips having elastic memory.

2 Claims, 3 Drawing Sheets

FORCE RESISTANT ASSEMBLIES AND SHOCK ABSORBING ARTICLE HOLDERS

BACKGROUND OF THE INVENTION

This invention deals with shock absorbing articles and systems prepared therefrom. Shock absorbing has many degrees. For example, shock absorbing in automobiles is handled by extremely durable highly shock absorbing shock assemblies. However, there are many other uses that do not require high shock absorbing capabilities.

Such examples can be found in bicycles, motorcycles, snowmobiles, jet skis, and like vehicles. Other examples would include shock absorbing for all terrain vehicles, not only on the vehicle itself, but also for racks and other assemblies that carry equipment on the vehicle itself.

There are many examples of racks and carriers for all terrain vehicles in the patent literature, but none of them deal with shock absorbing capabilities.

It has now been discovered that low shock absorbing capabilities can be obtained with the systems of this invention. The shock absorbing article holders of this invention have a shock absorbing assembly that acts as a low shock, shock absorber.

The inventor herein is not aware of any published literature that deals with shock absorption of the nature of the devices disclosed herein.

SUMMARY OF THE INVENTION

Thus, there is disclosed a shock absorbing system utilizing a combination of the force resisting assemblies that allows the carrying of guns and the like on all terrain vehicles without creating a problem with misalignment of scopes and the like.

The shock absorbing system comprises a first suspension system consisting of a square hollow housing having four internal corners therein. Each of the four internal corners contains therein, an elongated strip of elastomeric material. The square hollow housing has a cross sectional center point, that is, in viewing the square housing from the end, there is a cross sectional midpoint. Such systems are commercial and are available from Ondrives, Rosta Rubber suspension units, at WWW.ondrives.com. However, the Rosta Rubber suspension units cannot be utilized in this invention in that they require to be clamped into a holding position and cannot be welded in place. The devices of this invention are welded together and the devices of this invention depend on torsion bars that are welded or otherwise fixed to support bars rather than having an insert connection as described by the Rosta rubber Suspension unit.

The torsion bar has a hollow square configuration and an outside dimension lesser than the inside dimension of the square hollow housing. The torsion bar is insertable at the center cross sectional point of the square hollow housing and between the elastomeric strips of the suspension unit. The torsion bar has an L-shaped configuration near the point of insertion in the square hollow housing. From this point on, the torsion bar is extendable to form a V-shaped configuration, there being a branch bar joined to the torsion bar at about a midpoint between the insertion point and the bottom of the V-shaped configuration.

The torsion bar further extends to a top bar, the termination ends of the top bar and the branch bar are approximately the same distance from the attachment to the torsion bar. Each of the top bar and the branch bar are suspension units.

There is a square shaft inserted in the terminal ends of the top bar in the respective suspension units. Each square shaft is fixedly attached to one near end of each of the two spaced apart suspension units. The support bars each have a distal end and the distal end of each support bar is rotatably attached to a support means for an article.

There is yet a third embodiment of this invention which is a shock absorbing article holder comprising in combination, a base and the assemblies set forth just above. The base comprises a flat plate having an upper surface and two opposite ends.

The upper surface is surmounted by a square hollow housing extending essentially from one end to the opposite end of the flat plate, the square hollow housing having four internal corners therein.

The square hollow housing has a cross sectional center point contains therein four elongated elastomeric strips, one strip being located inside each corner of the square hollow housing.

There is a torsion bar, the torsion bar having a hollow square configuration an outside dimension lesser than the inside dimension of the square hollow housing. The torsion bar is insertable at the center cross sectional point of the square hollow housing and between the elongated elastomeric strips.

The torsion bar has an L-shaped configuration near the point of insertion in the square hollow housing, said torsion bar extendable to a V-shaped configuration. There is a branch bar joined to the torsion bar at about a midpoint between the insertion point and the bottom of the V-shaped configuration, said torsion bar further extending to a top bar.

The termination ends of the top bar and the branch bar are approximately the same distance from their attachment to the torsion bar such that their terminal ends are essentially vertically aligned.

Each of the top bar and branch bar have a hollow square configuration providing four internal corners wherein each of the top bar and the branch bar have four elongated elastomeric strips located therein, one strip being located in each corner thereof.

There is a square shaft inserted in the terminal ends of the top bar and the branch bar between the elongated elastomeric strips, each square shaft being fixedly attached to one near end of each of the two spaced apart support bars. The support bars each having a distal end.

The distal end of each support bar is rotatably attached to a flat panel, the flat panel having a back and a front, the attachments being in the same vertical line of the back of the flat panel and there being a shelf located at a lower edge and on the front of the flat panel.

It is contemplated within the scope of this invention to place belt loops on the back or bottom of the flat panel to accommodate a belt for holding an article on the flat panel.

It is also contemplated within the scope of this invention to have a belt for each loop that surrounds the flat plate and any article being held on the flat plate.

DETAILED DESCRIPTION OF THE INVENTION

Figure 1:
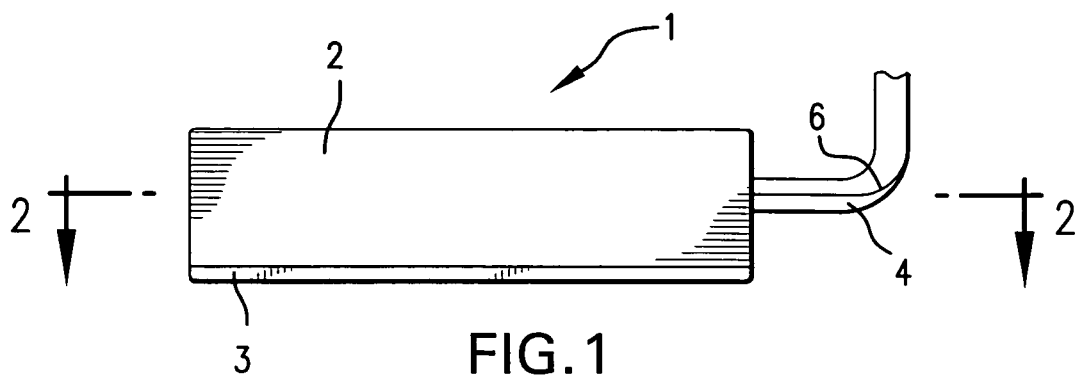
FIG. 1 is full front view of a force resistant mechanism of this invention.

Turning first to the force resistant mechanism of this invention, there is shown in FIG. 1 a full front view of a force resistant mechanism 1 of this invention in which there is shown a housing 2, a flat base 3 and a portion of the torsion bar 4. It should be noted that the housing 2 is securely fastened to the flat base 3 such that they do not separate upon use.

Figure 2:
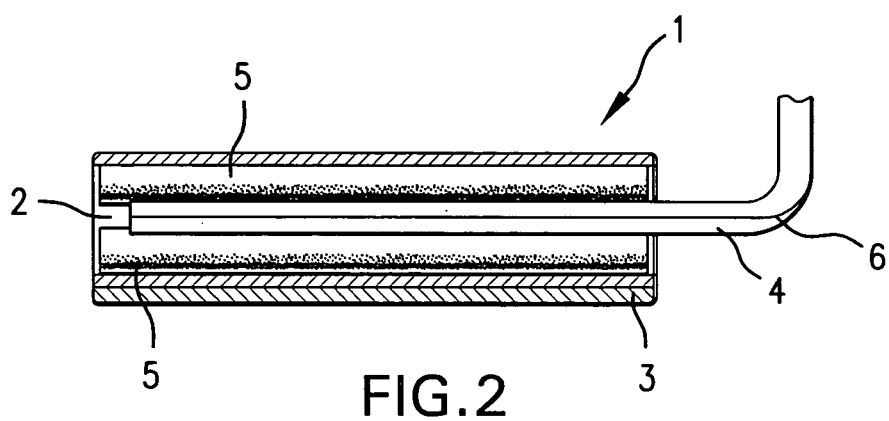
FIG. 2 is a full cross sectional view of a force resistant mechanism of FIG. 1, through the line 2-2.

FIG. 2 is a full cross sectional view of a force resistant mechanism of FIG. 1, through the line 2-2 in which there is shown the housing 2, the flat base 3 and a portion of the torsion bar 4. There is also shown two of the four elastomeric strips 5. It should be noted that the torsion bar 4 is firmly situated between the strips 5 such that the torsion bar 4 impinges on each of the elastomeric strips 5 essentially for the full length of the torsion bar 4.

Figure 3:
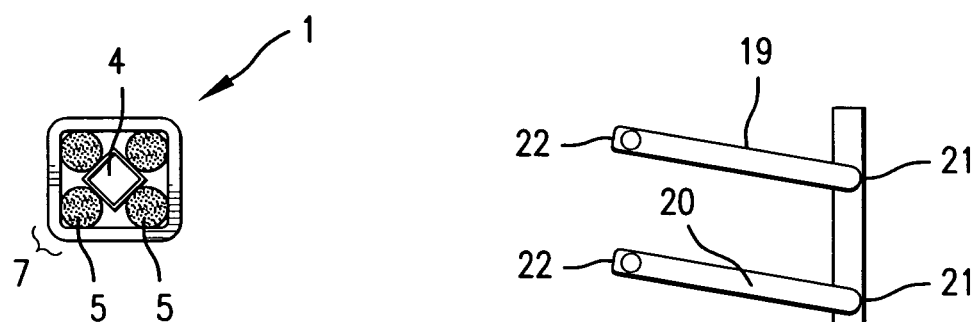
FIG. 3 is a full end view of the force resistant mechanism of FIG. 1.

The torsion bar 4 has a square configuration and as such, as the torsion bar 4 is turned or rotated in the housing with force, the edges 6 formed by the outside corners 7 (see FIG. 3), grab the elastomeric strips 5 and contort them out of their normal state such that when any force is released, the elastomeric strips 5 return to their normal configuration. In other words, the elastomeric material of this invention has elastic memory and when the force is released, the torsion bar 4 is returned to its starting position.

Figure 4:
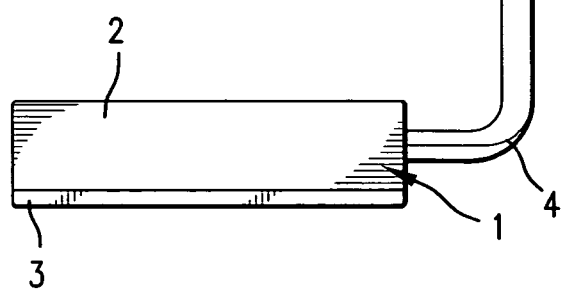
FIG. 4 is a full front view of a shock absorbing assembly of this invention without the flat plate attached thereto.

Turning now to FIG. 4, there is shown a full front view of a shock absorbing assembly of this invention without the flat plate 24 attached thereto.

Thus, there is shown the flat base 3, the housing 2, the torsion bar 4, and two branches from the torsion bar 4, that is, a top bar 8 and a branch bar 9. The top bar 8 and the branch bar 9 are more clearly viewed from FIGS. 6 and 7.

Figure 8:
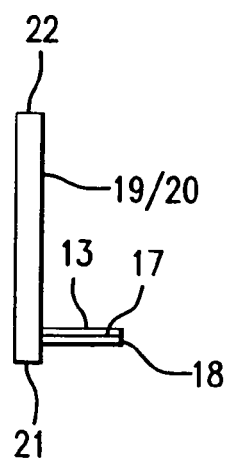
FIG. 8 is a full end view of the terminating end of a support bar.

FIG. 8 is a full end view of the top bar 8 and the branch bar 9 from the terminating ends 10 and 11, respectively, showing the elongated elastomeric strips 12 and a square shaft 13 in each. In other words, the terminal end 10 and the terminal end 11 are identical in construction, each having four elastomeric strips 12 and 13 and a square shaft 13. Since the construction of the top bar 8 and the branch bar 9 is the same, and is a square configuration, there are formed internal corners 14 and external corners 15. The branch bar 9 is identical in construction. The square shaft 13 is inserted into the terminal ends, respectively, of the top bar 8 and the branch bar 9 and has the capability to rotate or turn.

As in the construction of the torsion bar 4 and the housing 2 set forth Supra, the square shaft 13 has a square configuration and as such, as the square shaft 13 is turned or rotated in the top bar 8 and the branch bar 9 with force, the edges 17 formed by the outside corners 15 (see FIG. 8), grab the elastomeric strips 12 and contort them out of their normal state such that when any force is released, the elastomeric strips 12 return to their normal configuration. In other words, the elastomeric material of this invention has elastic memory and when the force is released, the square shafts 13 are returned to their starting positions as in the torsion bar/housing assembly set forth Supra.

Figure 9:
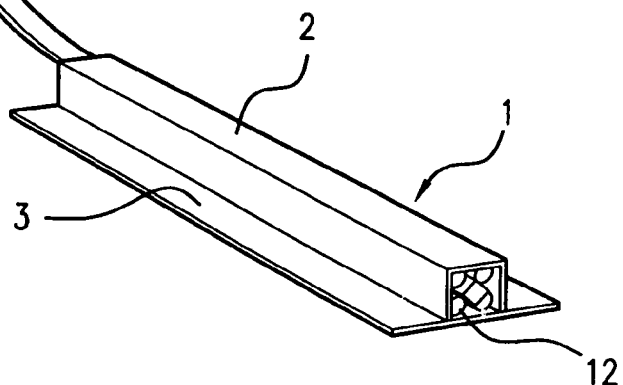
FIG. 9 is a full side view of a combination of a square shaft attached to a support bar.

The end 18 of the square shaft 13 for each of the square shafts 13 are each fixed to a separate support bar 19 and 20, respectively. FIG. 9 shows a full side view of a combination of a square shaft 13 with the edge 17 attached to the support bar 19 and/or 20 near its near end 21.

There is a distal end 22 of the support bars 19/20, and this end is rotatably attached to the back 23 of a flat panel 24 by any means that will allow the flat panel 24 to partially rotate around the axis 25 provided by the means 26 to attach the flat panel 24 to the distal ends 22 of the support bars 19/20.

The flat panel 24 has a shelf 27 attached at its bottom edge 28 that enhances the carrying capability of the apparatus. The shelf 27 can optionally have a lip.

Figure 5:
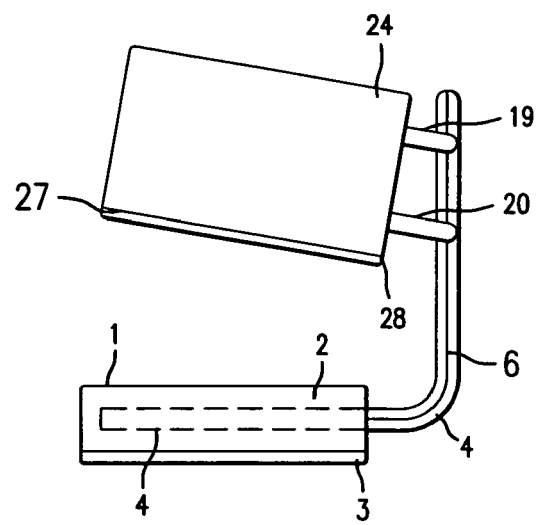
FIG. 5 is a full front view of the shock absorbing assembly of FIG. 4 with the flat plate attached thereto.
Figure 6:
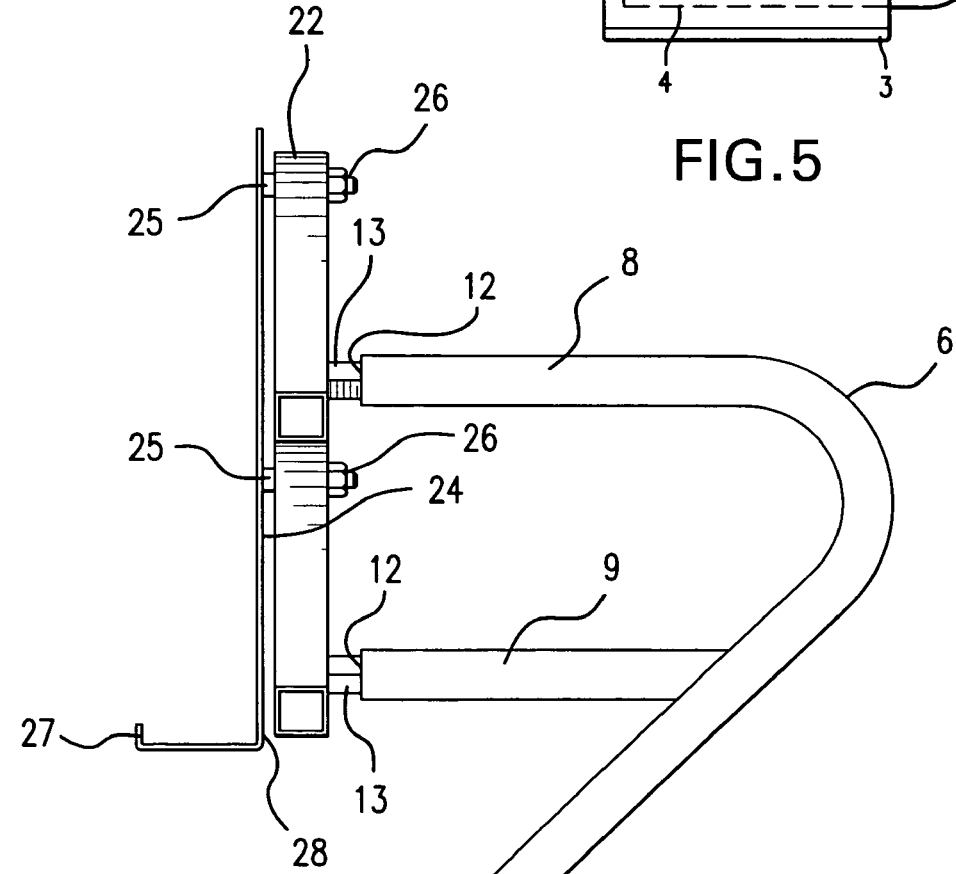
FIG. 6 is a full end view of the shock absorbing assembly of FIG. 4.
Figure 6:
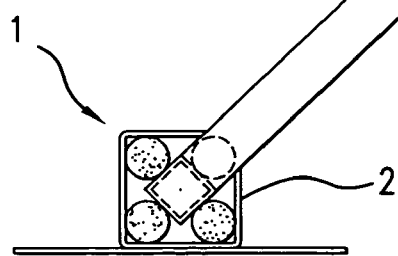
Figure 7:
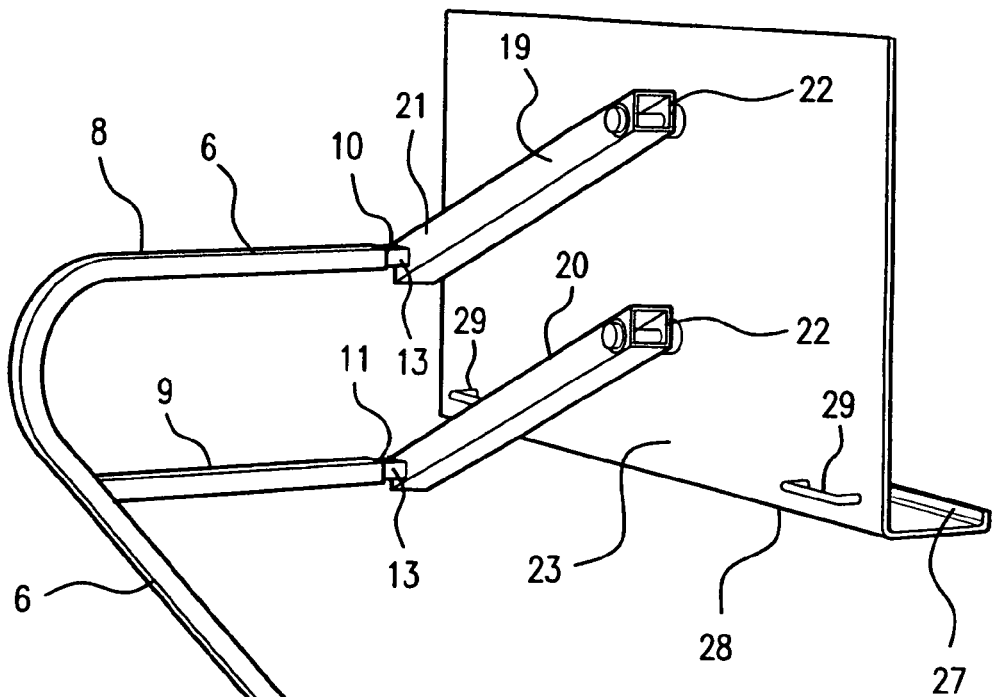
FIG. 7 is a full view in perspective of a device of this invention.

In use, the apparatus as shown in FIGS. 5, 6, and 7 can be mounted to, for example, an all terrain vehicle (ATV) and a long gun, for example a rifle, can be mounted on the flat panel 24. As the ATV is driven, the apparatus acts as a shock absorber, and when a shock causes the apparatus to move downwardly, the flat panel 24 rotates around points 25, the square shafts 13 rotate in their respective bars, and the torsion bar 4 rotates in the housing 2 simultaneously. When the effects of the downward movement have passed, the apparatus moves back into its resting position without using any assistance from any other source.

What is claimed is:

1. A shock absorbing system, said shock absorbing system comprising:
   i. a support system comprising:
   ii. a first square hollow housing having four internal corners therein, each of the four internal corners containing therein, an elongated strip of elongated elastomeric material, said first square hollow housing having a cross sectional center point;
   iii. a torsion bar, said torsion bar having a hollow square configuration, said torsion bar having the outside dimension lesser than an inside dimension of the first square hollow housing, said torsion bar insertable at a cross sectional center point of the first square hollow housing and between the elongated strip of elongated elastomeric material; said torsion bar having an L-shaped configuration near the point of insertion in the first square hollow housing, said torsion bar extendable to a V-shaped configuration,
   iv. there being a branch bar joined to the torsion bar at about a midpoint between the point of insertion and the bottom of the V-shaped configuration, said torsion bar further extending to a top bar,
      a pair of termination ends of the top bar and the branch bar being approximately the same distance from an attachment to the torsion bar;
      each of the top bar and branch bar having a second hollow square configuration providing four internal corners; each of the top bar and the branch bar having
   v. four elongated elastomeric strips located therein, one strip being located in each corner thereof;
   vi. there being a square shaft inserted in terminal ends of the top bar and the branch bar between the elongated elastomeric strips, each square shaft being fixedly attached to one near end of each of the two spaced apart support bars, each having a distal end; the distal end of each support bar being rotatably attached to a support means for an article.

2. A shock absorbing article holder comprising:
   a base, said base comprised of a flat plate having an upper surface and two opposite ends;
   said upper surface being surmounted by a square hollow housing extending essentially from one end to the opposite end of the flat plate said square hollow housing having four internal corners therein;

said square hollow housing having a cross sectional center point;

said square hollow housing containing therein four elongated elastomeric strips, one strip being located inside each corner of the square hollow housing;

a torsion bar, said torsion bar having a hollow square configuration, said torsion bar having an outside dimension lesser than an inside dimension of the square hollow housing;

said torsion bar insertable at the cross sectional center point of the square hollow housing and between the elongated elastomeric strips;

said torsion bar having an L-shaped configuration near the point of insertion in the square hollow housing, said torsion bar extendable to a V-shaped configuration, there being a branch bar joined to the torsion bar at about a midpoint between the point of insertion and the bottom of the V-shaped configuration, said torsion bar further extending to a top bar, a pair of termination ends of the top bar and the branch bar being approximately the same distance from their attachment to the torsion bar;

each of the top bar and branch bar having a hollow square configuration providing four internal corners;

each of the top bar and the branch bar having four elongated elastomeric strips located therein, one strip being located in each corner thereof;

there being a square shaft inserted in the termination ends of the top bar and the branch bar between the elongate elastomeric strips; each square shaft being fixedly attached to one near end of each of the two spaced apart support bars, each having a distal end;

the distal end of each support bar being rotatably attached to a flat panel, the flat panel having a back and a front, the attachments being in the same vertical line of the back of the flat panel and there being a shelf located at a lower edge and on the front of the flat panel.

* * * * *